Patented Sept. 21, 1954

2,689,856

UNITED STATES PATENT OFFICE 2,689,856

$\Delta^{8,14}$-17-KETO-10,13-DIMETHYL - CYCLOPENTANOPOLYHYDROPHENANTHRENE COMPOUNDS Karl Miescher, Riehen, and Jean-René Billeter, Basel, Switzerland, assignors to Ciba Pharmaceutical Products, Inc., Summit, N. J.

No Drawing. Application March 1, 1951, Serial No. 213,466

Claims priority, application Switzerland March 10, 1950

3 Claims. (Cl. 260—397.45)

The present invention relates to $\Delta^{8,14}$-17-keto - 10,13 - dimethyl - cyclopentanopolyhydrophenanthrene compounds. These new compounds differ from the hormones of the androstane and etiocholane series only by the supplementary double bond extending from the 8-position. They are therefore of outstanding importance for the synthesis of therapeutically active compounds, such as androsterone and testosterone.

A primary object of the present invention is the embodiment of compounds of the aforesaid class, which are characterized by the nucleus of the formula

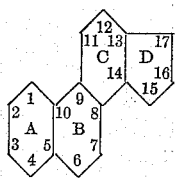

and which may contain a further double bond, for example in 4,5- or 5,6-position, and which may be also further substituted, especially in 3-position and, if desired, also in 11- or 12-position, by additional substituents, such as an oxo group or an hydroxyl group or a substituent convertible thereinto by hydrolysis, e. g. an esterified or etherified hydroxyl group.

A further object is the embodiment of a method for the synthesis of the said compounds.

These objects are realized by the present invention, according to which the specified cyclopentanopolyhydrophenanthrene compounds are obtained by treating aliphatic three-carbon carboxylic acids which contain in β-position a 2,13-dimethyl-hydrophenanthryl-(1) radical, the nucleus of which corresponds to the formula

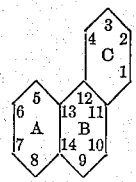

and contains at least one double bond extending from the 2-position, with an intramolecular acylating agent selected from the group consisting of tin tetrachloride, zinc chloride and boron trifluoride-etherate.

As starting materials for the present invention, there are employed especially β-(2,13-dimethyl-hydrophenanthryl-1)-propionic acids, which contain in 7-position of the phenanthrene skeleton an oxo or an hydroxyl group or a substituent convertible into an hydroxyl group by hydrolysis, as for example an etherified or esterified hydroxyl group, and which contain a double bond extending from the 2-position. The starting materials may in addition be unsaturated, for example in 8,14- or 9,14-position. Illustrative of the β-(2,13-dimethyl-hydrophenanthryl-1)-propionic acids which may be thus employed according to the invention are, for instance, the two isomeric β-(2,13-dimethyl-7β-hydroxy-dodecahydrophenanthryl-1)-propionic acids having a double bond extending from the 2-position and having cis- and trans-configurations at the carbon atoms 13 and 14, β-($\Delta^{9,14}$-2,13-dimethyl-7β-hydroxy-decahydrophenanthryl-1)propionic acid, with a second double bond extending from the 2-position and also their 7-esters and 7-ethers, for example 7-acetates, 7-propionates, 7-benzoates, 7-methyl ethers or 7-benzyl esters.

The starting materials to be used according to the present invention may be produced by various methods. Thus, for example, a 1-keto-2,13-dimethyl-hydrophenanthrene which contains in 7-position an oxo or hydroxyl group or a substituent convertible into an hydroxyl group by hydrolysis is reacted with a halogen acetic acid ester and a metal, such as zinc, the obtained product dehydrated and hydrolyzed, and the unsaturated hydrophenanthryl-(1)-acetic acid thus produced converted into the corresponding hydrophenanthryl-(1)-propionic acid, advantageously by the Arndt-Eistert method by way of the acid chloride and diazo ketone.

The intramolecular acylation is advantageously carried out in a diluent such as a lower organic fatty acid or an anhydride thereof, for example acetic acid, propionic acid, acetic anhydride or propionic anhydride or mixtures thereof, and is carried out with heating.

In the intramolecular acylation according to the present invention $\Delta^{8,14}$-17-keto-polyhydrophenanthrenes are produced. Depending upon the starting materials employed, further double bonds may be present, for example originating from the carbon atoms 5 and/or 11. These ketones may also be further substituted, for example in 7-position and also if desired in 11- or 12-position.

The following examples illustrate the invention, the relation between parts by weight and parts by volume being the same as that between the kilogram and liter. Temperatures are in degrees centigrade.

Example 1

10 parts by weight of β-(Δ$^{9,14}$-7β-hydroxy-2,13-dimethyl-decahydrophenanthryl-1)-propionic acid, containing a second double bond which extends from the carbon atom 2, are acetylated with 10 parts by volume of acetic anhydride in 30 parts by volume of pyridine. The crude acetate is dissolved in 50 parts by volume of acetic anhydride. After addition of 0.2 part by volume of tin tetrachloride, the solution is heated for 5 minutes on the water bath, slowly treated with 10 parts by volume of water and, after cooling, poured into 500 parts by volume of water. The precipitated reaction product is taken up in ether. The ether solution is thereupon washed until neutral, dried and evaporated. The residue is dissolved in 80 parts by volume of methanol and boiled for 30 minutes with 8 parts by weight of potassium hydroxide and 16 parts by volume of water. After separation of an acid fraction, the neutral constituents are acetylated with 5.6 parts by volume of acetic anhydride and 16 parts by volume of pyridine. The acetate obtained is treated with a solution in methanol of semicarbazide acetate whereupon a difficultly soluble semicarbazone which melts at 262–263° crystallizes out. By precipitation of the mother liquors with water, there is obtained a second easily soluble semicarbazone which melts at 230°. 1 part by weight of the semicarbazones is split up by boiling in 5 parts by volume of glacial acetic acid with 0.6 part by volume of water and 0.6 part by volume of pyroracemic acid in the presence of 0.8 part by weight of fused sodium acetate, whereby from the higher melting semicarbazone Δ$^{5,6}$; $^{8,14}$-3β-acetoxy-androstadienone-(17) is obtained of melting point 160–162° ([α]$_D$=–41° in alcohol). From the lower melting semicarbazone, there is obtained an isomeric doubly unsaturated acetoxy ketone of melting point 120–121° ([α]$_D$=+337° in alcohol).

In the above example the ring formation may be effected, instead of with tin tetrachloride, also with boron trifluoride etherate in the presence of acetic anhydride on the water bath.

In an analogous manner, ring formation may also be caused to occur in the case of β-(Δ$^{8,14}$-7-keto-2,13-dimethyl-decahydro-phenanthryl-1)-propionic acid which contains a further double bond extending from the carbon atom 2.

The starting material employed in the above example may be produced for example as follows:

500 parts by volume of ether and 500 parts by volume of benzene are poured onto 100 parts by weight of zinc, activated with 1 part by weight of iodine and within 2 hours at boiling temperature a solution is added drop by drop of 150 parts by weight of Δ$^{9,14}$-1-keto-7β-acetoxy-2,13-dimethyl-dodecahydro-phenanthrene and 65 parts by volume of bromacetic acid ethyl ester in 750 parts by volume of benzene. After 6 hours' boiling, the whole is poured into 1500 parts by volume of ice-cold 2 N-hydrochloric acid. The organic solvent, which contains the reaction product, is washed with water, separated and evaporated. The residue thus obtained is dissolved in 1250 parts by volume of pyridine, 500 parts by volume of phosphorus oxychloride are introduced and the mixture boiled for 1 hour. After cooling, it is poured into 10,000 parts by volume of ice water and the precipitated reaction product taken up in ether. The ethereal solution is washed until neutral, dried and evaporated. For hydrolysis the residue is boiled for 14 hours in a mixture of 4000 parts by volume of ethanol, 70 parts by weight of potassium hydroxide and 350 parts by volume of water. After considerable concentration, dilution with water and washing with ether, 58 parts by weight are obtained of Δ$^{9,14}$-7β-hydroxy-2,13-dimethyl-decahydrophenanthryl-(1)-acetic acid of melting point 174–175° ([α]$_D$=–214° in alcohol), containing a further double bond which extends from the carbon atom 2.

58 parts by weight of this acid are acetylated with 50 parts by volume of acetic anhydride and 150 parts by volume of pyridine. The solution of the acetate in 250 parts by volume of benzene is converted into the acid chloride, which melts at 137°, by means of 35 parts by volume of oxalyl chloride. The acid chloride is dissolved in 500 parts by volume of ether and converted by means of 10 parts by weight of diazo-methane in 400 parts by volume of ether into the corresponding diazo ketone. The crude diazo ketone is dissolved in 1200 parts by volume of ethanol and treated at boiling temperature within 1½ hours with 70 parts by weight of silver oxide added in portions. After boiling for a further 2 hours the product is filtered from silver oxide, diluted with 500 parts by volume of methanol and hydrolyzed by boiling for 14 hours with 30 parts by weight of potassium hydroxide and 150 parts by volume of water. From the considerably concentrated solution, by acidification, 38 parts by weight are obtained of β(Δ$^{9,14}$-7β-hydroxy-2,13-dimethyl-decahydro-phenanthryl-1)-propionic acid of melting point 174–175° ([α]$_D$=–240° in chloroform), containing a further double bond which extends from the carbon atom 2.

Example 2

4 parts by weight of the starting material used in Example 1 are acetylated in the manner there described. The acetate obtained is dissolved in 24 parts by volume of acetic anhydride and 1 part by volume of a 2 percent solution of freshly fused zinc chloride in glacial acetic acid added. The mixture is boiled for 30 minutes under reflux and worked up as described in Example 1. The same two semi-carbazones of melting point 262–263° and 230° respectively are obtained which, after splitting, yield the same isomeric ketones of melting point 160–162° and 120–121° respectively.

Example 3

10 parts by weight of β-(7β-hydroxy-2,13-dimethyl-dodecahydro-phenanthryl-1)-propionic acid (with transconfiguration of the rings A and B), containing a double bond which extends from the carbon atom 2, are acetylated with 10 parts by volume of acetic anhydride and 30 parts by volume of pyridine. The acetate obtained is dissolved in 50 parts by volume of acetic anhydride, 0.4 part by volume of tin tetrachloride is added and the whole is heated for 5 minutes on the boiling water bath. The product is treated with 20 parts by volume of water, cooled and poured into 500 parts by volume of water and the reaction product taken up in ether. The ether solution is washed until neutral, dried and evaporated. The solution of the residue in 10 parts by volume of ethanol is boiled for 30 minutes with 1 part by weight of potassium hydroxide and 2 parts by volume of water. The neutral constituents are acetylated with 1 part by volume of acetic anhydride and 3 parts by volume of pyridine. The acetate is dissolved in 10 parts by volume of benzene and 50 parts by volume of hexane and subsequently adsorbed on 125 parts by weight of aluminum oxide. By elution with hexane or carbon tertachloride the $\Delta^{8,14}$=3β-acetoxy-androstenone-(17), which melts at 88–90° ($[\alpha]_D$=−272° in chloroform), is obtained, which yields a semicarbazone melting at 253–255°.

The intramolecular acylation can be carried out in an analogous manner with β-(2,13-dimethyl-hydrophenanthryl-1)-propionic acids having a double bond extending from carbon atom 2, which contain in 7-position a propionyloxy, benzoyloxy, methoxy or benzyloxy group, whereby the corresponding 3-propionyloxy-, 3-benzoyloxy-, 3-methoxy- and 3-benzyloxy-androstenones-(17) are obtained.

The starting material employed in this example may be produced in the following manner:

Within 2 hours at boiling temperature a solution of 200 parts by weight of 1-keto-7β-acetoxy-2,13-dimethyl-perhydrophenanthrene with trans-configuration of the rings A and B, 80 parts by volume of bromacetic acid ethyl ester and 800 parts by volume of benzene, is added drop by drop to 150 parts by weight of zinc activated with 1 part by weight of iodine and onto which have been poured 1000 parts by volume of ether and 1000 parts by volume of benzene. After 6 hours' boiling, the whole is poured into 1500 parts by volume of ice-cold 2 N-hydrochloric acid. The reaction product which is isolated as described in Example 1 is dissolved in 1500 parts by volume of pyridine and boiled for 1 hour with 500 parts by volume of phosphorus oxychloride. After cooling, the solution is poured into 10,000 parts by volume of ice water. The precipitated dehydration product is dissolved in ether and the ether solution washed until neutral, dried and evaporated. The 7β-acetoxy-2,13-dimethyl-dodecahydrophenanthryl-1-acetic acid ethyl ester thus obtained, which contains a double bond extending from the carbon atom 2, boils at 166–172° under a pressure of 0.2 mm. The acid obtained therefrom by hydrolysis is acetylated with acetic anhydride and pyridine and thereupon in benzene solution converted by means of oxalyl chloride into the acid chloride. By treatment with an ethereal diazomethane solution the diazo-ketone is obtained therefrom, which is reacted in methanol solution with silver oxide. From this reaction product there is obtained by hydrolysis the β-(7β-hydroxy-2,13-dimethyl-dodecahydro-phenanthryl-1)-propionic acid with trans-configuration of the rings A and B, containing a double bond which extends from the carbon atom 2.

*Example 4*

14 parts by weight of β-(7β-hydroxy-2,13-dimethyl-dodecahydrophenanthryl-1)-propionic acid with cis-configuration of the rings A and B, containing a double bond which extends from the carbon atom 2, are acetylated with 14 parts by volume of acetic anhydride and 40 parts by volume of pyridine. The solution of the acetate in 55 parts by volume of acetic anhydride is, after the addition of 0.6 part by volume of tin tetrachloride, heated for 5 minutes on the boiling water bath, then slowly treated with 20 parts by volume of water, cooled and poured into 500 parts by volume of water. The precipitated reaction product is taken up in ether and the ether solution washed neutral, dried and evaporated. The residue is boiled for ½ hour in a mixture of 130 parts by volume of methanol, 13 parts by weight of potassium hydroxide and 26 parts by volume of water. The neutral constituents obtained are acetylated with 7 parts by volume of acetic anhydride and 20 parts by volume of pyridine. The acetylation product is thereupon dissolved in 30 parts by volume of benzene and 90 parts by volume of hexane and adsorbed on 210 parts by weight of aluminum oxide. After elution with hexane or carbon tetrachloride there is obtained the $\Delta^{8,14}$-3β-acetoxy-aetio-cholenone-(17), which has the melting point 164–166° ($[\alpha]_D$=−245° in alcohol). The semicarbazone produced therefrom in the manner previously described, melts at 247–249°. By treatment of the mother liquors from the above acetoxy ketone with semi-carbazide solution an isomeric semi-carbazone which melts at 195° is obtained.

The intramolecular acylation can be carried out without protecting the hydroxyl group in 7-position of the starting material.

Evidence of the aforementioned constitution of the resultant cyclizing products is obtained as follows: First, the keto group therein is reduced into an hydroxy group. 1 part by weight of the resultant 17-ol is then heated to 340–350° for 36 hours with 10 parts by weight of selenium in a sealed tube. By the usual working up and chromatographic purification 0.13 part of Diels' hydrocarbon (3'-methyl-1,2-cyclopentanophenanthrene) of melting point 127–128° is obtained.

What is claimed is:

1. A process for the manufacture of a $\Delta^{8,14}$-17-keto-10,13-dimethyl-cyclopentanopolyhydrophenanthrene compound, which comprises treating an aliphatic three-carbon carboxylic acid which corresponds to the formula

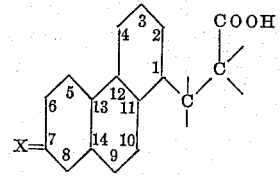

and contains at least one double bond extending from the carbon atom in the 2-position and at most two double bonds, one of which extends from the carbon atom in the 2-position and the other from the carbon atom in the 14-position, and wherein X represents a member selected from the group consisting of the groupings

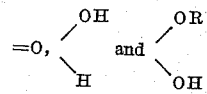

R standing for the acyl radical of a lower hydrocarbon carboxylic acid, with an intramolecular acylating agent selected from the group consisting of tin tetrachloride, zinc chloride and boron trifluoride-etherate.

2. $\Delta^{8,14}$-17-keto-10,13-dimethyl-cyclopentano-polyhydrophenanthrene compounds, which contain in 3-position a member selected from the group consisting of an oxo group, an hydroxyl group and an hydroxyl group esterified with a lower hydrocarbon carboxylic acid.

3. $\Delta^{8,14}$-3β-acetoxy-androstenone-(17).

References Cited in the file of this patent

UNITED STATES PATENTS

| Number | Name | Date |
|---|---|---|
| 2,170,124 | Butenandt | Aug. 22, 1939 |
| 2,193,674 | Haberland | Mar. 12, 1940 |
| 2,409,798 | Reichstein | Oct. 22, 1946 |